US008570954B2

(12) United States Patent
Wu et al.

(10) Patent No.: US 8,570,954 B2
(45) Date of Patent: Oct. 29, 2013

(54) SYSTEM AND METHOD FOR QOS PROVISIONING IN BROADBAND WIRELESS MESH NETWORKS

(75) Inventors: Fang Wu, Pleasanton, CA (US); Fuyong Zhao, San Jose, CA (US); Haiyun Luo, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1205 days.

(21) Appl. No.: 12/033,828

(22) Filed: Feb. 19, 2008

(65) Prior Publication Data

US 2008/0198824 A1 Aug. 21, 2008

Related U.S. Application Data

(60) Provisional application No. 60/890,387, filed on Feb. 16, 2007.

(51) Int. Cl.
*H04W 4/00* (2009.01)
(52) U.S. Cl.
USPC .......... 370/329; 370/352; 455/444; 455/450; 455/452.1
(58) Field of Classification Search
USPC .......................................... 370/229, 337, 338
See application file for complete search history.

(56) References Cited

U.S. PATENT DOCUMENTS

| 6,112,128 | A | 8/2000 | Steinmetz | |
|---|---|---|---|---|
| 7,359,771 | B2 * | 4/2008 | Soulie et al. | 701/19 |
| 7,522,518 | B1 * | 4/2009 | Satapathy | 370/229 |
| 7,813,314 | B2 * | 10/2010 | Fulknier et al. | 370/328 |
| 2002/0068633 | A1 | 6/2002 | Schlaifer | |
| 2002/0078040 | A1 * | 6/2002 | Hawkinson | 707/4 |
| 2004/0048613 | A1 * | 3/2004 | Sayers et al. | 455/426.2 |
| 2004/0153288 | A1 | 8/2004 | Tovinkere et al. | |
| 2006/0098614 | A1 | 5/2006 | Moon et al. | |
| 2006/0112143 | A1 | 5/2006 | Subramanian | |
| 2006/0276192 | A1 | 12/2006 | Dutta | |
| 2007/0030857 | A1 | 2/2007 | Fulknier et al. | |
| 2009/0310504 | A1 * | 12/2009 | Engbersen et al. | 370/252 |

FOREIGN PATENT DOCUMENTS

| CN | 1433617 A | 7/2003 |
|---|---|---|
| WO | WO 01/41376 A2 | 6/2001 |

OTHER PUBLICATIONS

PCT/US2007/085985—PCT Search Report and Written Opinion, May 22, 2008, Pro Trade Sports, Inc.
Chinese Office Action for Chinese Patent Application 200880005073.2 dated Nov. 2, 2011.

(Continued)

*Primary Examiner* — Steven H Nguyen
*Assistant Examiner* — Henry Baron
(74) *Attorney, Agent, or Firm* — Blakely, Sokoloff, Taylor & Zafman LLP

(57) ABSTRACT

A method and system for QoS provisioning in broadband wireless mesh networks are disclosed. According to one embodiment, a computer-implemented method, comprises providing a dual mode mesh router having a plurality of radios, wherein the mesh router is used in a cell of a plurality of cells that covers a geographic region. The mesh router includes one or more WiMAX backhaul radios, one or more WiFi backhaul radios, one or more WiMAX access radios, one or more WiFi access radios, and three or more intra-mesh radios. Traffic is received at the dual mode mesh router. A minimum quality of service requirement is identified for the traffic. The traffic is routed via the one or more WiMAX backhaul radio when the minimum quality of service meets a predetermined value.

15 Claims, 5 Drawing Sheets

(56) References Cited

OTHER PUBLICATIONS

Chinese Office Action for Chinese Patent Application 200880005073.2 dated Aug. 30, 2012.

Chinese Office Action for Chinese Patent Application 200880005073.2 dated Jan. 14, 2013.

International Search Report for International Application No. PCT/US 08/54330.

* cited by examiner

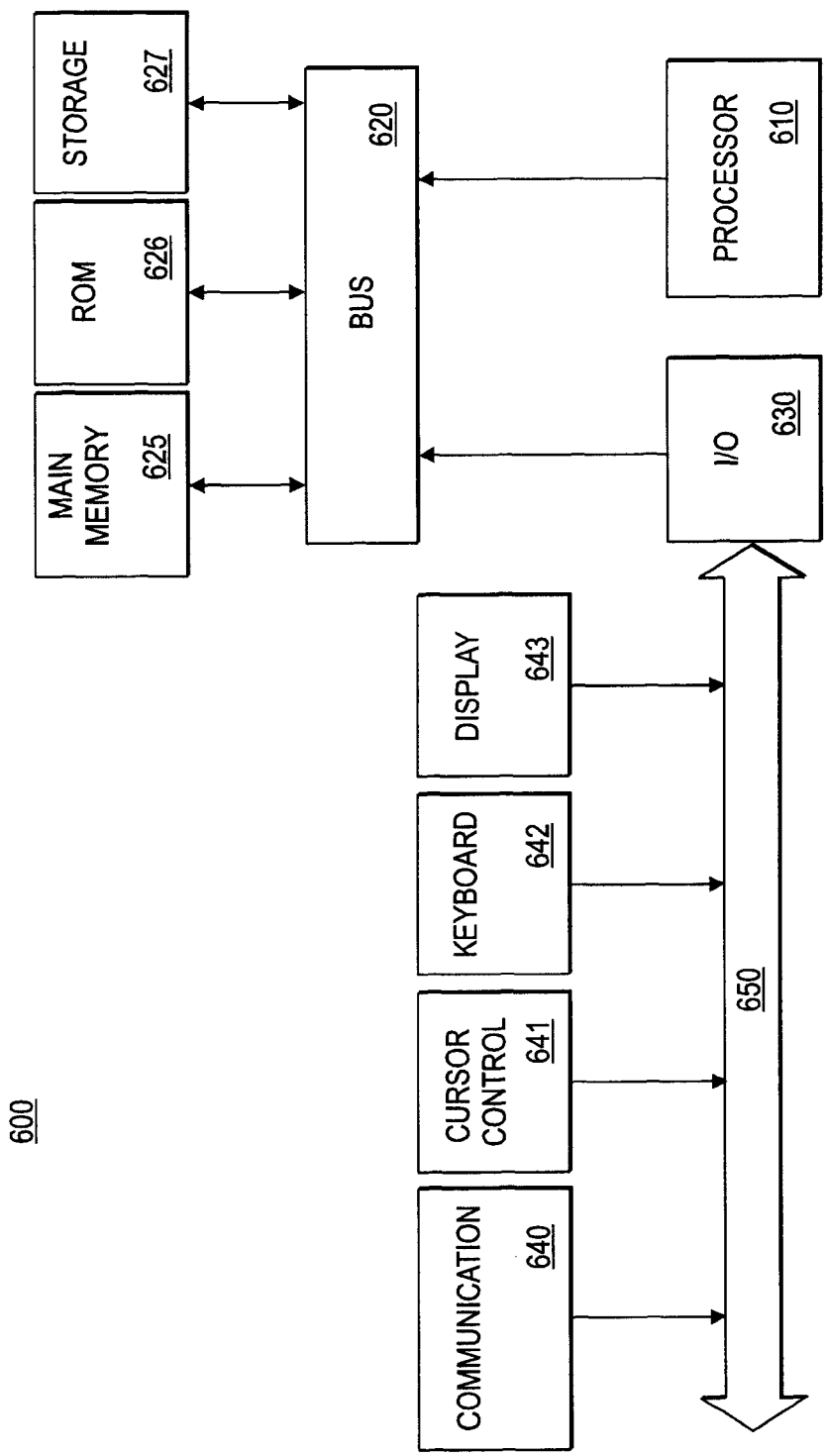

SYSTEM AND METHOD FOR QOS PROVISIONING IN BROADBAND WIRELESS MESH NETWORKS

This application claims priority to U.S. Provisional Application Ser. No. 60/890,387 entitled "A Method and System Design for WiMax and WiFi Dual Mode Mesh Networks," filed on Feb. 16, 2007 and, which is hereby incorporated by reference.

FIELD

The field of the invention relates generally to wireless networks and more particularly relates to a system and method for QoS provisioning in broadband wireless mesh networks.

BACKGROUND

With recent technological advancements in computer and wireless communications, mobile wireless computing has seen increasingly widespread use and application. Not constrained by wires, users with mobile computing devices can move around freely and can communicate with one another in circumstances where there is no fixed infrastructure. In such cases, they can form a mobile ad-hoc network (MANet) or mobile wireless mesh network. A mobile wireless mesh network is an autonomous system of wireless mobile routers (and associated hosts) that can move randomly and reorganize themselves into an arbitrary network without any underlying backbone and infrastructure.

Mirroring the structure of the wired Internet, a routed wireless mesh network is highly flexible and inherently fault-tolerant. The wireless routers in the mesh network not only provide Internet access for the users but also form a network infrastructure that allow routing data to a destination within the wireless mesh network. This greatly simplifies line-of-sight problems and extends the reach and coverage of the network with a minimal amount of network infrastructure and interconnection costs.

As the Internet continues to gain in popularity, demand for broadband access has outpaced the wired infrastructure in many areas. Wireless broadband networks make high-performance access possible where the wired infrastructure is non-existent, outdated or impractical. However, the previous wireless broadband technologies have not been practical for price-sensitive mass market deployment due to a combination of technological constraints and high-deployment costs.

Although originally developed for military use, wireless mesh technologies have also shown great value in commercial sectors such as metro, enterprise, campus and public safety applications. Hundreds of cities around the globe have deployed or are planning to deploy wireless mesh networks to unwire their cities and provide wireless broadband services to their citizens, enterprises and governments. Wireless mesh technology is gaining momentum.

SUMMARY

A method and system for QoS provisioning in broadband wireless mesh networks are disclosed. According to one embodiment, a computer-implemented method, comprises providing a dual mode mesh router having a plurality of radios, wherein the mesh router is used in a cell of a plurality of cells that covers a geographic region. The mesh router includes one or more WiMAX backhaul radios, one or more WiFi backhaul radios, one or more WiMAX access radios, one or more WiFi access radios, and three or more intra-mesh radios. Traffic is received at the dual mode mesh router. A minimum quality of service requirement is identified for the traffic. The traffic is routed via the one or more WiMAX backhaul radio when the minimum quality of service meets a predetermined value.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 6 illustrates an exemplary computer architecture for use with the present system, according to one embodiment.

Figure 1:
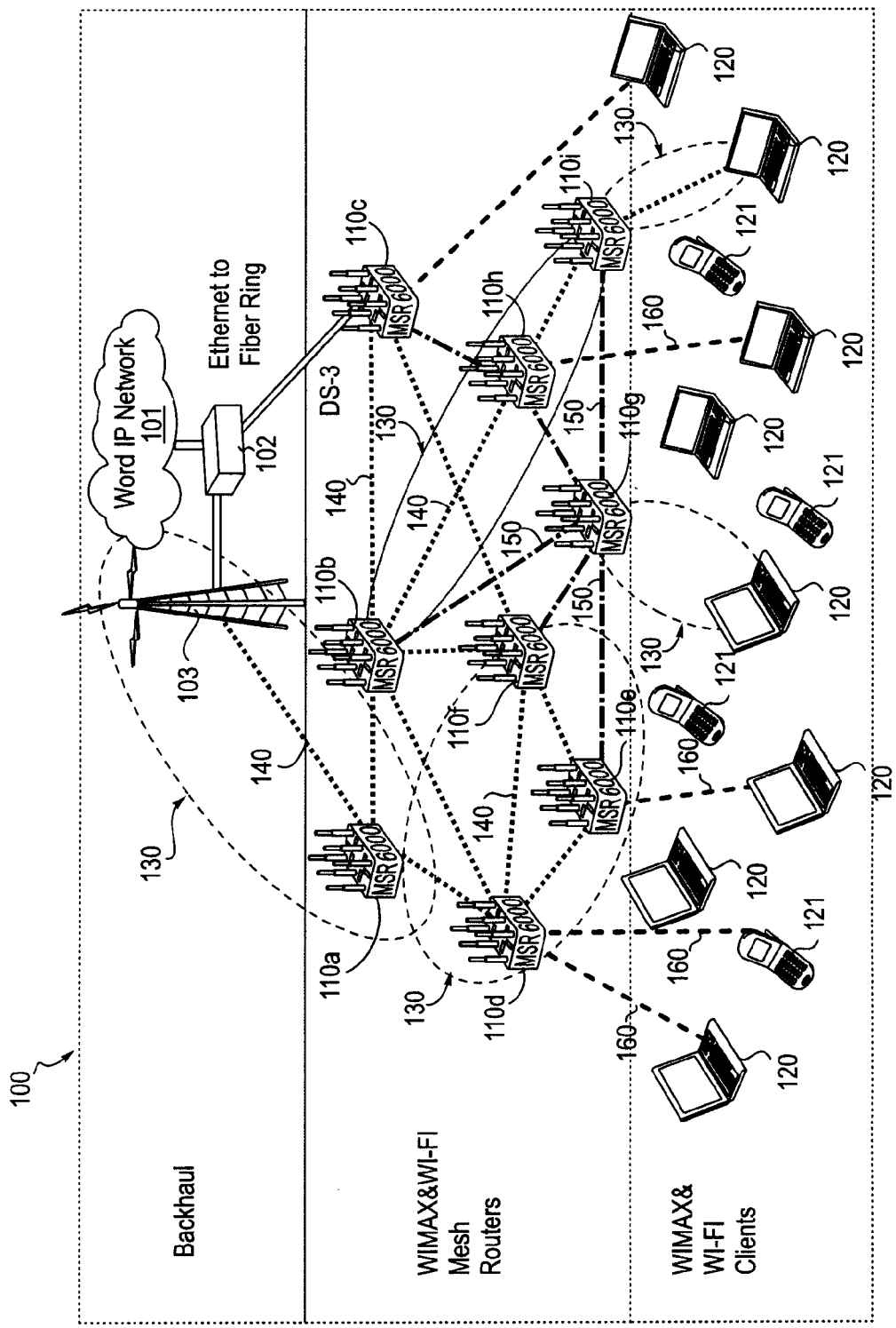
FIG. 1 illustrates an exemplary combined WiMAX and WiFi mesh system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A method and system for QoS provisioning in broadband wireless mesh networks is disclosed. According to one embodiment, a computer-implemented method, comprises providing a dual mode mesh router having a plurality of radios, wherein the mesh router is used in a cell of a plurality of cells that covers a geographic region. The mesh router includes one or more WiMAX backhaul radios, one or more WiFi backhaul radios, one or more WiMAX access radios, one or more WiFi access radios, and three or more intra-mesh radios. Traffic is received at the dual mode mesh router. A minimum quality of service requirement is identified for the traffic. The traffic is routed via the one or more WiMAX backhaul radio when the minimum quality of service meets a predetermined value.

Each of the features and teachings disclosed herein can be utilized separately or in conjunction with other features and teachings to provide a system and method for Quality of Service (QoS) provisioning in broadband wireless mesh networks. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Traditional wireless cellular networks have been offering high-quality mobile voice services for years. With the increasing demand for higher bandwidth for mobile data services, future wireless networks are required to effectively carry both types of traffic, i.e., voice and data. Generally, two different approaches are taken to achieve this end.

Traditional mobile cellular carriers may upgrade their cellular networks for efficient transport of data traffic. With the increased network throughput, the next generation cellular networks are expected to provide quality voice services exceeding the current QoS level. However, the throughput demand of data applications is orders of magnitude bigger than that of traditional voice applications. Furthermore, throughput increase achievable over the current bandwidth is limited. It is very expensive for the cellular carriers to acquire an adequate spectrum for broadband wide-area wireless data service. In fact, the lack of bandwidth is one of the primary hurdles that the cellular industry faces when planning to upgrade their cellular networks to 3G or even 4G.

The convergence of voice and data for wireless networks is being advanced by the Internet community. The Internet community continuously upgrades its existing wireless local area networks (WLANs) and mesh networks with QoS provisioning mechanisms to support voice and other QoS sensitive real-time applications. Designed as the last-hop wireless extension to the Internet, WLANs and mesh networks support high-throughput data services with packet switching using the existing wireless channel bandwidth. More importantly, existing WLANs and mesh networks operate on unlicensed, shared wireless frequency bands (e.g., 2.45 GHz for ISM and 5.15-5.35 GHz for UNII). It allows the cellular carriers to avoid the cost of licensing a particular wireless frequency spectrum that is regulated by national agencies.

However, there is no service guarantee in existing WLANs or mesh networks. Furthermore, due to the competition for the shared wireless frequency bands, the available bandwidth for any specific WLAN becomes highly variable and unpredictable. In an effort to boost the utility of the existing network without expanding the bandwidth, an approach was taken to differentiate the QoS sensitive traffic (e.g., voice) from other QoS insensitive traffic (e.g., Web browsing). An example of such an approach is the IEEE 802.11e standard that is an amendment to the original IEEE 802.11 WLAN standards for the provisioning of differentiated services. Although aligned with the best-effort (or so called "better than best-effort") service model of the Internet, it does not meet QoS requirements for voice and other real-time applications.

According to one embodiment, a network architecture and the accompanying mechanisms for provisioning cost-effective, low-complexity QoS are disclosed. The present system and method identifies and effectively schedules QoS sensitive and insensitive user traffic through wireless links operating on both licensed and unlicensed frequency bands respectively. The scheduling policies tailor the operation model of individual carriers based on the instantaneous demands and the time-variant channel bandwidth availability. The overall user experience is optimized by transporting QoS sensitive traffic over licensed frequency bands. The present system and method exploits the shared license-free frequency bands to transport the large-volume of QoS insensitive traffic (i.e. data). It significantly lowers the load on the expensive and limited licensed frequency bands while meeting the increasing throughput demands for wireless data applications. The present system and method allows for the convergence of voice and data traffic in a unified network architecture, and provides higher network capacity than cellular networks.

In the following examples, IEEE 802.11 WLAN (also known as WiFi) and IEEE 802.16 (also known as WiMAX) represent a wireless mesh network and a cellular network respectively. It is understood that WiFi and WiMAX in the present application are chosen for illustrative purposes and other wireless mesh networks (e.g., Bluetooth, ultra-wideband (UWB)) and cellular networks (e.g., 3G and 4G) may be used without departing from the scope of the present invention.

Most of the current wireless mesh products are based on the 802.11 wireless local area network (WLAN) technology, which is favored for its low cost and ubiquity. Since standardization, 802.11 WLAN (exchangeably referred to as WiFi herein) has had tremendous success because of its speed, low cost and ease of use. It has been widely adopted in the computer and telecommunication industries with the installed client-base of more than 100 million units. Today, WiFi is standard on most mobile computing devices (e.g., laptops, PDAs) and is gaining popularity to become a standard feature on cellular phones as well. As a result, the WiFi connectivity comes at low to no incremental cost to users.

Unlike WiFi that is designed for a local, relatively small environment, WiMAX (IEEE 802.16) is designed to provide wireless Metropolitan Area Network (WMAN) to end users. There are two main applications of WiMAX: fixed WiMAX (IEEE 802.16-2004) that is typically used for point-to-multi-point applications enabling broadband access to homes and businesses, and mobile WiMAX (IEEE 802.16e) that offers the full mobility of cellular networks at broadband speeds (up to 75 Mbps) for running high bandwidth applications such as multimedia streaming. Designed for Metropolitan Area Network (MAN) and telecom carriers, IEEE 802.16 MAC is optimized for long-distance links and enhanced QoS. WiMAX also offers deployment flexibility by using both licensed and unlicensed bands and by applying flexible channel assignment and modulation schemes. However, as a newer standard compared to WiFi, WiMAX is costlier to deploy since WiMAX client devices are not as affordable as WiFi client devices.

Network architects who design large-scale broadband wireless networks achieve the highest performance and lowest cost by taking advantages of both WiFi and WiMAX technologies. The present method and system introduces a WiMAX and WiFi dual-mode mesh network to achieve these goals under a unified network architecture and user interface, as set forth hereinafter.

FIG. 1 illustrates an exemplary combined WiMAX and WiFi dual-mode mesh router system 100, according to one embodiment. The WiMAX backhaul 140 of a dual-mode mesh router 110 connects local points of presence (PoPs) including other dual-mode mesh routers, WiMAX-embedded client devices 120 and 121 within the metro mesh cloud 130. For the mesh routers 110 that do not have established WiMAX backhaul links 140 or are out of the WiMAX coverage area, intra-mesh WiFi backhauls 150 are used instead. This dual-mode mesh router system 100 connects its client devices, whether WiFi-embedded, WiMAX-embedded or both, not only to the wired network 101 for allowing access to other networks (e.g., the Internet) but also to other client devices for peer-to-peer communication. The dual-mode mesh router system 100 is robust and has the flexibility of network connectivity, enhanced network performance and long-distance coverage.

For the intra-mesh connectivity, mesh routers 110 use both WiMAX and various forms of WiFi (e.g., 802.11a/b/g/n) to provide the best performance. Mesh routers 110 choose a protocol that provides the best end-to-end performance. Due to the dynamics of network connectivity within the network, different criteria might be used to determine the best performance.

For client connectivity, mesh routers 110 with both WiFi and WiMAX access radios support both WiFi and WiMAX clients. Client devices 120 and 121 supporting WiFi and/or WiMAX are connected to the mesh router 110 using the protocol that offers the best performance. As underlying network conditions vary, changes may be made to switch from one to another network protocol to maintain the best performance. The network performance of the available intra-mesh transport radios is frequently monitored and diagnosed to provide the best connectivity option, according to one embodiment.

Figure 2:
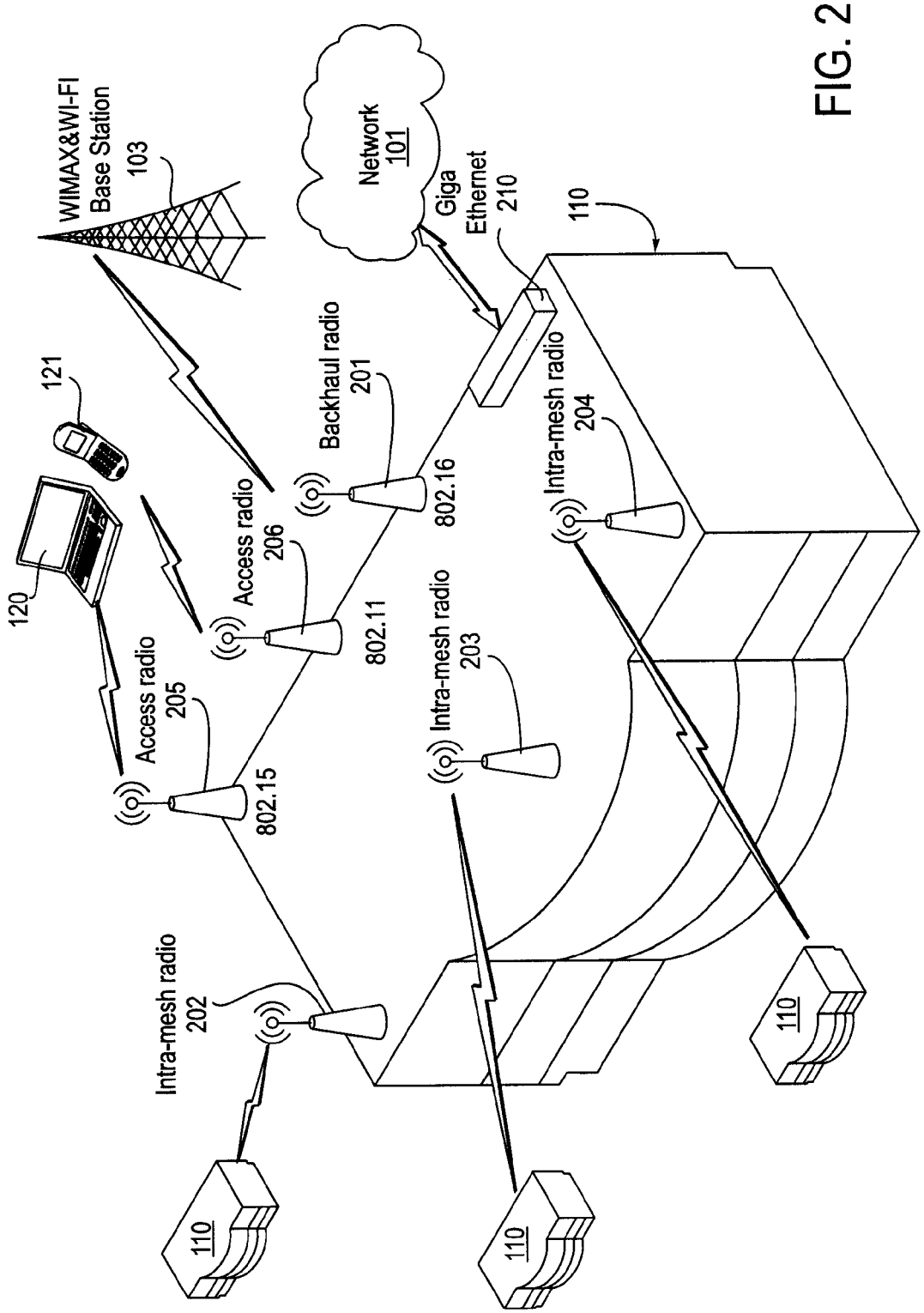
FIG. 2 illustrates an exemplary WiMAX and WiFi dual-mode mesh router, according to one embodiment.

FIG. 2 illustrates an exemplary WiMAX and WiFi dual-mode mesh router 110, according to one embodiment. WiMAX and WiFi dual-mode mesh router 110 includes six radios including one IEEE 802.16 (e.g., IEEE 802.16e, IEEE 802.16-2004) backhaul radio 201 that communicates with the central WiMAX base station 103. Backhaul radio 201 serves as a long-distance backhaul for the wireless mesh cloud 130. Route 110 includes three IEEE 802.16 or IEEE 802.11 (a/b/g or n) radios 202, 203 and 204 for intra-mesh connections with other mesh routers 110. Route 110 also includes one IEEE 802.11 access radio 206 for WiFi client connections; and one IEEE 802.16 access radio 205 for WiMAX client connections.

According to another embodiment, the WiMAX and WiFi dual-mode mesh router 110 may have more or less than six radios, and it supports various combinations of radios. For example, mesh router 110g of FIG. 1 may not have an established WiMAX backhaul link or may not even have a WiMAX backhaul radio 201. If the mesh router 110 is on the edge of the network, the intra-mesh radios covering outside of the coverage area might be turned off to save power.

According to yet another embodiment, the intra-mesh radios 202, 203 and 204 are directional radios trisecting the cell into three 120° sectors. The coverage within the cell and the reach to the neighboring cells are optimized in a hexagonal form.

WiMAX and WiFi dual-mode mesh router system 100 is built on a modular hardware and software platform and supports various radio combinations. Multiple backhauls and client connectivity options increase the throughput of the system. Multiple routing options also provide a highly reliable and scalable system. Giga-Ethernet port 210 allows for a wired connection to the network 101.

According to one embodiment, an intelligent radio management software manages WiMAX and WiFi intra-mesh radio links. The connectivity metrics of each radio link are monitored, and the software updates the layer-3 routing protocol for the availability and quality of those radio links. Intelligent layer-3 wireless mesh routing protocols are used to construct a truly peer-to-peer mesh. WiMAX and WiFi dual-mode mesh router system 100 supports seamless roaming among WiFi, WiMAX and cellular phone networks.

Dual-mode mesh router system 100 supports the wireless mesh network with the flexible placement of cells with fewer access limitations and more access options. The dual-mode mesh router system 100 is highly scalable in routing and roaming among WiFi and WiMAX protocols. Because of multi-path redundancy, dual-mode mesh router system 100 is more robust and tolerant to faults. In addition, dual-mode mesh router system 100 requires fewer wired gateways when compared to the wired networks, thus the costs for the deployment and operation are greatly reduced.

The initial cost of building a dual-mode mesh router system 100 is lower in comparison with wired mesh network because the mesh routers have wireless backhauls and the acquisition of sites to deploy the wireless mesh routers is cheaper. There is no need to build radio towers or stations. There is no requirement for line-of-sight. The deployment of the dual-mode mesh router system 100 is faster compared to wired mesh router network since the building of radio towers and physical construction thereof are unnecessary. Wireless radios equipped in the mesh routers 110 are also cheaper to integrate. Therefore, the dual-mode mesh router system promises faster return on investment.

WiFi is widely used and provides sufficiently fast connections to most of the users within the coverage area. WiFi chip and client devices are very low cost, and the presently disclosed dual-mode mesh router system 100 best utilizes the benefits of WiFi's affordability while providing additional flexibility and coverage options using WiMAX technology.

WiMAX is optimized for long-distance applications. It offers enhanced QoS and more deployment options by using licensed and/or unlicensed network bandwidth, thereby providing flexible channel assignment and modulation schemes. WiFi and WiMAX dual-mode mesh router system combines the benefits of the two technologies.

Figure 3:
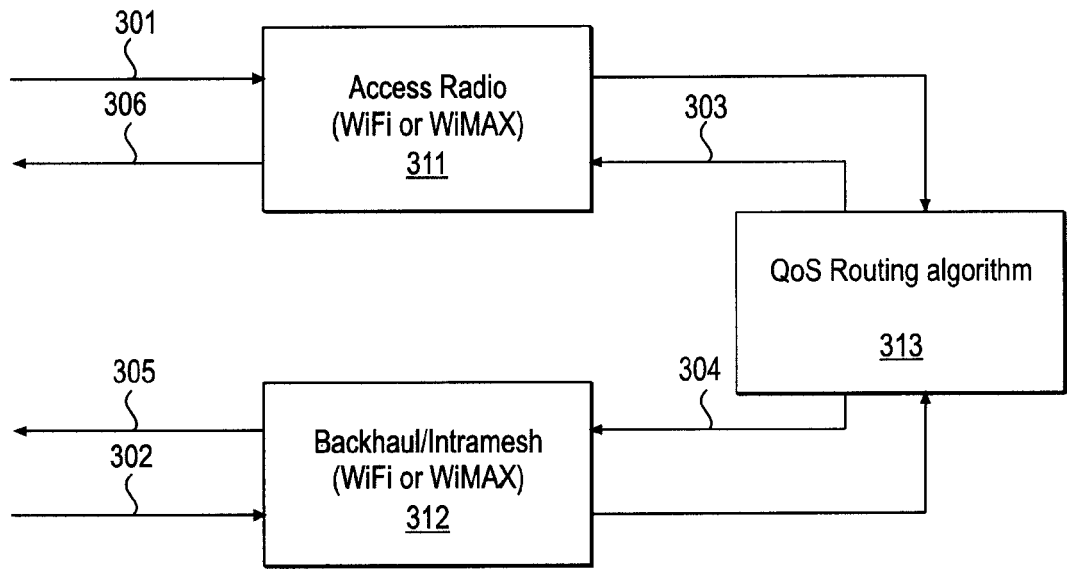
FIG. 3 illustrates an exemplary functional block diagram for QoS routing, according to one embodiment.

FIG. 3 illustrates an exemplary functional block diagram for QoS routing, according to one embodiment. Incoming traffic (301; 302) is categorized into two separate classes based on various factors including QoS sensitivity requirement (e.g., voice or data), user level (e.g., paid or free) or mobility support (e.g., stationary, portable, mobile). QoS routing algorithm 313 evaluates incoming traffic (301; 302) at each intermediate mesh router 110 to dynamically optimize the end-to-end QoS through routing and re-routing and to maximize the utilization of the wireless spectrum resource. The QoS optimization at each intermediate mesh router 110 does not rely on the scheduling along a single link and allows for cross-link between links of different performance and costs (e.g., WiMAX to WiFi, WiFi to WiMAX). QoS routing algorithm 313 may further classify incoming traffic (301; 302) for fine-grained QoS control and mobility optimization. Depending on the classification and optimization performed, incoming traffic (301; 302) is routed back to either access radios 311 via 303 or backhaul/intra-mesh radios 312 via 304. The traffic (301; 302) is routed or re-routed to other mesh routers 110 via backhaul link 305 or to client devices 120 and 121 via backhaul link 306.

Backhaul radio 201 and intra-mesh radios (202-204) in mesh router 110 are architecturally similar to access radios (205, 206). Based on the load on a specific wireless link, QoS routing algorithm 313 may temporarily downgrade the transport QoS of certain traffic with a lower priority, and re-schedule or re-route the traffic from a congested route in a licensed frequency band to an underutilized route of an unlicensed frequency band. Similarly, QoS routing algorithm 313 may temporarily upgrade the QoS of a certain traffic, and re-schedule or re-route the user traffic from an unlicensed frequency band to an underutilized route in the licensed frequency band. With system level cross-link optimization, the utility of the overall system is maximized.

Figure 4:
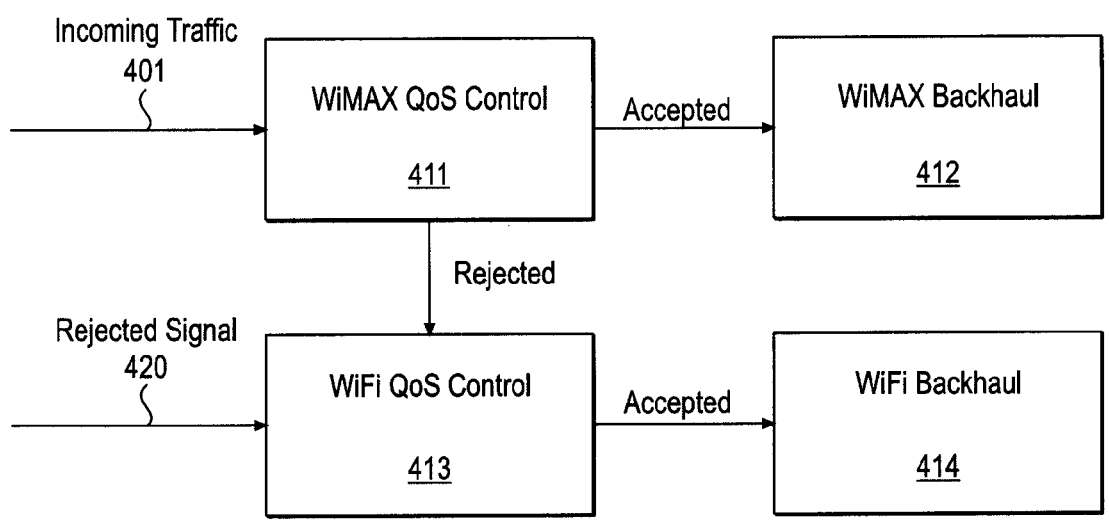
FIG. 4 illustrates an exemplary functional block diagram for a QoS provisioning and control algorithm, according to one embodiment.

FIG. 4 illustrates an exemplary functional block diagram for a QoS provisioning and control algorithm, according to one embodiment. For incoming traffic 401, routing and forwarding through a WiMAX backhaul is always preferred as it provides better QoS and reliability. WiMAX QoS control 411 receives incoming traffic 401 and determines where to route or forward incoming traffic 401. Routing through WiMAX backhaul 412 is granted whenever possible. If no bandwidth is available to route to WiMAX backhaul 412, incoming traffic 401 is instead routed to WiFi QoS control 413. If incoming traffic 401 at WiFi QoS control 413 has a data rate reservation requirement or a priority requirement that may be satisfied by WiFi routing, incoming traffic 401 is routed to WiFi backhaul 414. Otherwise, incoming traffic 401 can not be routed by WiFi backhaul and is rejected (420).

Figure 5:
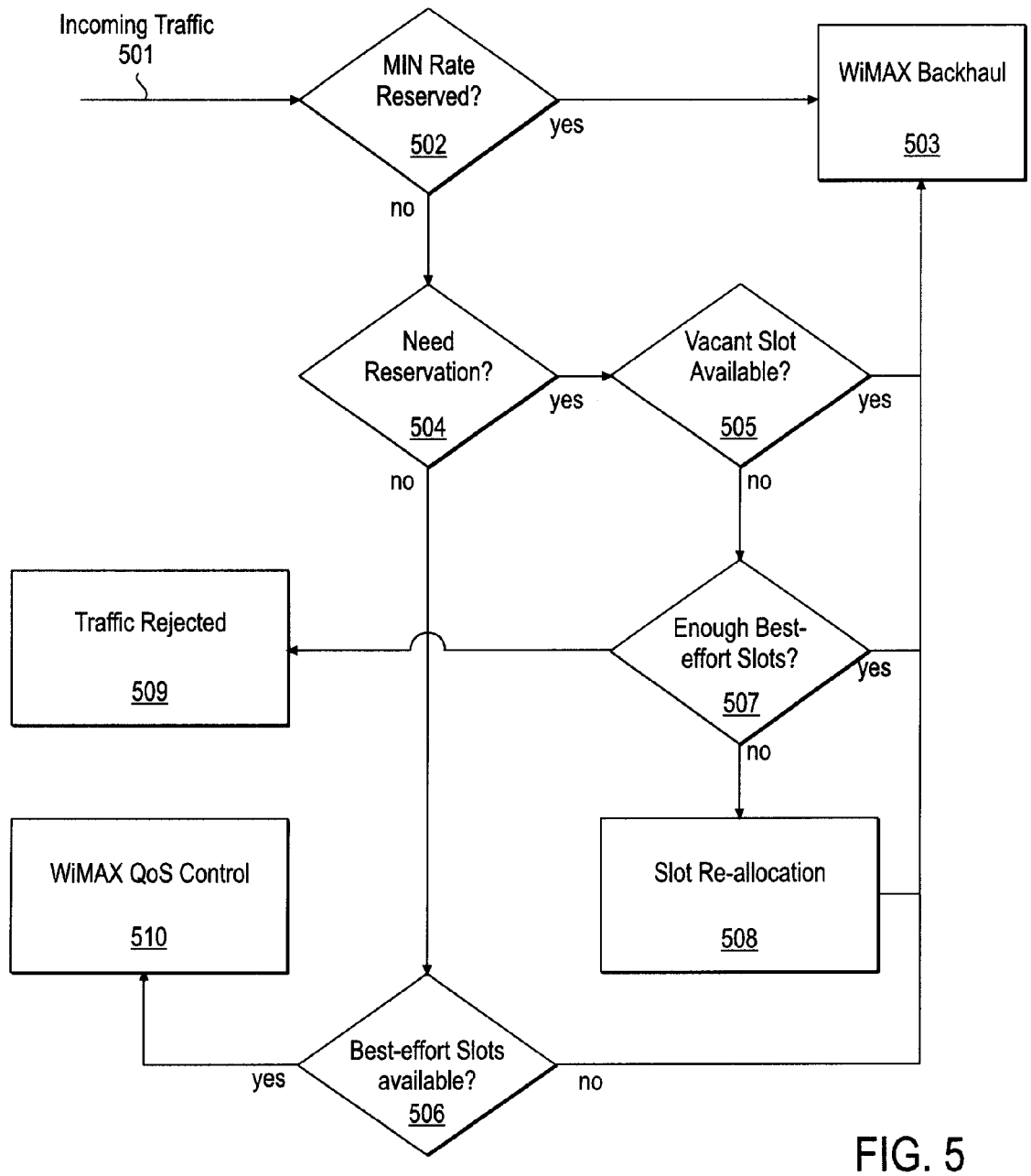
FIG. 5 illustrates an exemplary QoS control process, according to one embodiment.

FIG. 5 illustrates an exemplary QoS control process, according to one embodiment. Incoming traffic 501 is inspected for a rate reservation requirement (502). If a minimum rate reservation is required, (e.g., voice traffic), incoming traffic 501 is routed to WiMAX backhaul 503 to meet the reservation requirement. If incoming traffic 501 does not have a minimum reservation requirement, other reservation requirements are identified. (504). At this point, certain incoming traffic 501 may not require a reservation (e.g., Web browsing), then it may be routed to either WiMAX backhaul (503) or WiFi QoS control 510 depending on the availability of best-effort slots (506). Incoming traffic 501 requiring a reservation but not having a minimum rate reservation, is routed to WiMAX backhaul 503 if an unallocated or vacant slot is available (505). If there is no unallocated or vacant slot but a best-effort slot is available, incoming traffic 501 is re-allocated to the best-effort slot and subsequently routed to WiMAX backhaul (503). If a best-effort slot is not available, then incoming traffic 501 is rejected because there is no route for the incoming traffic that has the require reservation requirement (509).

Depending on the QoS requirement, incoming traffic 501 may be downgraded if routing through WiFi mesh backhaul is acceptable. In general, incoming traffic 501 with stringent reservation requirements, for example high-priority voice flows are rejected if bandwidth is not available on the licensed frequency band. Data traffic that has no reservation requirement may never be rejected since it does not require any level of QoS or service guarantee, and can always be forwarded along WiFi backhauls in the worst case scenario.

FIG. 6 illustrates an exemplary computer architecture 600 for use with the present system, according to one embodiment. Computer architecture 600 can be used to implement a maintenance server for the wireless network 100 or the QoS routing algorithm 313 within a mesh router 110 of FIG. 1. One embodiment of architecture 600 comprises a system bus 620 for communicating information, and a processor 610 coupled to bus 620 for processing information. Architecture 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Architecture 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Architecture 600 can also be coupled to a second I/O bus 650 via an I/O interface 630. A plurality of I/O devices may be coupled to I/O bus 650, including a display device 643, an input device (e.g., an alphanumeric input device 642 and/or a cursor control device 641).

The communication device 640 allows for access to other computers (servers or clients) via a network. The communication device 640 may comprise a modem, a network interface card, a wireless network interface or other well known interface device, such as those used for coupling to Ethernet, token ring, or other types of networks.

The present dual-mode mesh router system described herein is highly modular and flexible and provides better performance, increased throughput and wider coverage area by utilizing the technical benefits of both WiFi and WiMAX technologies while reducing the deployment cost.

A method and system for QoS provisioning in broadband wireless mesh networks have been disclosed. Although the preferred embodiments of the present invention have been illustrated and described in detail, it will be readily apparent to those skilled in the art that various modifications may be made therein without departing from the sprit of the present invention or from the scope of the appended claims.

We claim:

1. A computer-implemented method, comprising:
   receiving incoming traffic at a network device;
   classifying the incoming traffic into two or more quality of service (QoS) categories at an intermediate node in a wireless network; and
   re-routing, by the network device, the incoming traffic through cross links based on a classified QoS category associated with the incoming traffic, wherein re-routing the incoming traffic further comprises:
      in response to a reservation requirement being identified and an unallocated slot being available in a licensed frequency band, re-routing the incoming traffic to the unallocated slot in the licensed frequency band to meet the reservation requirement;
      in response to the reservation requirement being identified but no unallocated slot being available in the licensed frequency band, re-routing the incoming traffic to a best-effort slot in the licensed frequency band; and
      in response to the reservation requirement being identified and down-gradable, re-routing the incoming traffic to an unlicensed frequency band with lowered QoS requirements.

2. The computer-implemented method of claim 1, wherein re-routing of the incoming traffic based on the classified QoS category includes cross-linking between links of different performance and cost, wherein the links comprise one or more of a WiMAX backhaul link, a WiMAX access link, a WLAN mesh backhaul link, and a WLAN access link.

3. The computer-implemented method of claim 1, further comprising classifying the incoming traffic for fine-grained QoS control and mobility optimization.

4. The computer-implemented method of claim 1, wherein re-routing the incoming traffic through cross links based on the classified QoS category associated with the incoming traffic includes:
   temporarily downgrading the transport QoS of the incoming traffic with the lowered QoS requirements, and
   re-scheduling or re-routing the incoming traffic from a congested route in the licensed frequency band to an underutilized route in the unlicensed frequency band.

5. The computer-implemented method of claim 1, wherein re-routing the incoming traffic through cross links based on the classified QoS category associated with the incoming traffic includes:
   temporarily upgrading the QoS of the incoming traffic, and
   re-scheduling or re-routing the incoming traffic from the unlicensed frequency band to an underutilized route in the licensed frequency band.

6. A non-transitory computer-readable medium having stored thereon a plurality of instructions, said plurality of instructions when executed by a computer, cause said computer to perform:
   receiving incoming traffic at a network device;
   classifying the incoming traffic into two or more quality of service (QoS) categories at an intermediate node in a wireless network; and
   re-routing, by the network device, the incoming traffic through cross links based on a classified QoS category associated with the incoming traffic, wherein re-routing the incoming traffic further comprises:
      in response to a reservation requirement being identified and an unallocated slot being available in a licensed frequency band, re-routing the incoming traffic to the unallocated slot in the licensed frequency band to meet the reservation requirement;
      in response to the reservation requirement being identified but no unallocated slot being available in the licensed frequency band, re-routing the incoming traffic to a best-effort slot in the licensed frequency band; and
      in response to the reservation requirement being identified and down-gradable, re-routing the incoming traffic to an unlicensed frequency band with lowered QoS requirements.

7. The non-transitory computer-readable medium of claim 6, wherein re-routing of the incoming traffic based on the classified QoS category includes cross-linking between links of different performance and cost, wherein the links comprise one or more of a WiMAX backhaul link, a WiMAX access link, a WLAN mesh backhaul link, and a WLAN access link.

8. The non-transitory computer-readable medium of claim 6 having stored thereon-additional instructions, said additional instructions when executed by a computer, cause said computer to further perform classifying the incoming traffic for fine-grained QoS control and mobility optimization.

9. The non-transitory computer-readable medium of claim 6, wherein re-routing the incoming traffic through cross links based on the classified QoS category associated with the incoming traffic includes:
   temporarily downgrading the transport QoS of the incoming traffic with the lowered QoS requirements, and
   re-scheduling or re-routing the incoming traffic from a congested route in the licensed frequency band to an underutilized route in the unlicensed frequency band.

10. The non-transitory computer-readable medium of claim 6, wherein re-routing the incoming traffic through cross links based on the classified QoS category associated with the incoming traffic includes:
   temporarily upgrading the QoS of the incoming traffic, and
   re-scheduling or re-routing the incoming traffic from the unlicensed frequency band to an underutilized route in the licensed frequency band.

11. A network device, comprising:
   a processor;
   a memory coupled to the processor; and
   a traffic controller that
      receives incoming traffic,
      classifies the incoming traffic into two or more quality of service (QoS) categories, and
      re-routing the incoming traffic through cross links based on a classified QoS category associated with the incoming traffic, wherein re-routing the incoming traffic further comprises:
      in response to a reservation requirement being identified and an unallocated slot being available in a licensed frequency band, re-routing the incoming traffic to the unallocated slot in the licensed frequency band to meet the reservation requirement;
      in response to the reservation requirement being identified but no unallocated slot being available in the licensed frequency band, re-routing the incoming traffic to a best-effort slot in the licensed frequency band; and
      in response to the reservation requirement being identified and down-gradable, re-routing the incoming traffic to an unlicensed frequency band with lowered QoS requirements.

12. The network device of claim 11, wherein re-routing of the incoming traffic based on the classified QoS category includes cross-linking between links of different performance and cost, wherein the links comprise one or more of a WiMAX backhaul link, a WiMAX access link, a WLAN mesh backhaul link, and a WLAN access link.

13. The network device of claim 11, wherein the traffic controller further classifies the incoming traffic for fine-grained QoS control and mobility optimization.

14. The network device of claim 11, wherein the traffic controller re-routing the incoming traffic through cross links based on the classified QoS category associated with the incoming traffic includes:
   temporarily downgrading the transport QoS of the incoming traffic with the lowered QoS requirements, and
   re-scheduling or re-routing the incoming traffic from a congested route in the licensed frequency band to an underutilized route in the unlicensed frequency band.

15. The network device of claim 11, wherein the traffic controller re-routing the incoming traffic through cross links based on the classified QoS category associated with the incoming traffic includes:
   temporarily upgrading the QoS of the incoming traffic, and
   re-scheduling or re-routing the incoming traffic from the unlicensed frequency band to an underutilized route in the licensed frequency band.

* * * * *